United States Patent [19]

Wrighton et al.

[11] 4,439,302
[45] Mar. 27, 1984

[54] REDOX MEDIATION AND HYDROGEN-GENERATION WITH BIPYRIDINIUM REAGENTS

[75] Inventors: Mark S. Wrighton, Winchester, Mass.; Dana C. Bookbinder, East Greenwich, R.I.; James A. Bruce, Somerville, Mass.; Raymond N. Dominey, Pensacola, Fla.; Nathan S. Lewis, Palo Alto, Calif.

[73] Assignee: Massachusetts Institute of Technology, Cambridge, Mass.

[21] Appl. No.: 324,496

[22] Filed: Nov. 24, 1981

[51] Int. Cl.³ .............................................. C25F 7/00
[52] U.S. Cl. ................... 204/290 R; 204/291; 204/129; 428/704; 428/1; 502/167
[58] Field of Search ............... 204/129, 291, 290 R, 204/242; 252/428, 430, 429 R, 431 N; 428/411, 426, 457

[56] References Cited

U.S. PATENT DOCUMENTS 3,923,645 12/1975 Anderson et al. ............... 252/431 N
4,361,497 11/1982 Boldt et al. ........................ 252/428

Primary Examiner—R. L. Andrews
Attorney, Agent, or Firm—Arthur A. Smith, Jr.; Thomas J. Engellenner

[57] ABSTRACT

A variety of redox mediating agents employing bipyridinium reagents and such reagents in conjunction with dispersed noble metals, such as platinium, are disclosed as coatings for substrates and electrodes. The agents may be charged by an applied voltage or by photoelectric effects or may be equilibrated with hydrogen. The agents are useful in reducing biological materials and electrolytic hydrogen production.

14 Claims, 7 Drawing Figures

REDOX MEDIATION AND HYDROGEN-GENERATION WITH BIPYRIDINIUM REAGENTS

TECHNICAL FIELD

This invention relates to chemical reduction and oxidation (redox) agents and, in particular, redox agents for biological reductions and electrolytic reactions.

BACKGROUND OF THE INVENTION

Attention is directed to commonly assigned, copending patent application, U.S. Ser. No. 319,177 by M. S. Wrighton and D. C. Bookbinder entitled "Synthesis of N,N'-Dialkyl-4,4'Bipyridinium Reagents", filed July 14, 1981, disclosing a novel class of viologens (4,4'bipyridinium compounds) which may be polymerized and covalently bonded to surfaces as well as the use of these viologens in electrochromic (color-changing) display devices; this application is hereby incorporated by reference. This copending application identifies a number of binding groups, such as silicon alkoxides, silicon halides, boron alkoxides and boron halides, which are useful in binding viologens to substrates.

Generally, in redox catalysis, one is concerned with lowering the kinetic barrier to electron transfer from one molecule (or a surface) to another molecule. One area of interest is electron-reduction of materials, particularly biological materials, at surfaces, which surfaces may be conducting, semiconducting or insulating depending on the application. Another area of interest concerns hydrogen evolution (i.e. in electrolysis) and the reverse reaction, hydrogen oxidation (i.e. electricity generating fuel cells).

Reductions of complex biological materials pose special problems. Most redox agents are highly selective in their actions on various molecules. Care must also be taken to avoid unacceptable by-products. For example, when a redox agent reduces biological molecule, it yields an oxidized by-product which is often unacceptable to the biological system of interest. These by-products typically must be removed by tedious chromatography or dialysis.

One alternative is electrochemical reduction using an electrode at the proper potential to induce the desire reaction. However, when the necessary reduction involves metal-containing macromolecules having an electron-transfer function, the molecules often do not respond at the conventional electrode because the molecule's own redox center (typically a chelated metal ion) can not come close enough to the electrode.

Moreover, electrochemical reactions may be stymied by fouling of the electrode surface as a result of nonspecific adsorption of the biological material onto the electrode. Thus, there exists a need for novel redox agents which can induce reactions without adverse by-products and which can be used in reducing complex biological materials.

There also exists a need for redox mediating agents which can improve electrolysis reactions, particularly photoelectrochemical hydrogen generation. In order to decompose water in an electrolytic cell a photocathode must present excited electrons as reducing equivalents with enery sufficient to reduce $H^+$ in solution; at this point $H_2$ is thermodynamically capable of being liberated. In photoelectrochemical cells a p-type semiconductor is typically used as a photocathode the semiconductor responding to light by producing photo-excited electrons. Although various photoelectrodes have been developed, results to date have not been promising. It appears that the $H_2$ evolution is limited by the rate of reaction, not the energy needed to drive it. Thus, there is a need for redox mediating agents which can accelerate this rate of reaction.

In running the hydrogen reaction in the reverse direction, for example, in fuel cells to generate electricity, activation of hydrogen can again be a problem. In a fuel cell, $H_2$ is decomposed into $2H^+$ and $2e^-$, in which the electrons are then available for electricity. There also exists a need to improve this rate of reaction.

SUMMARY OF THE INVENTION

We have discovered a variety of redox mediating agents employing bipyridinium reagents and such reagents in conjunction with a dispersed noble metal. Our agents may be reduced photoelectrochemically or by an applied voltage; they may also be equilibrated with hydrogen. Typically our reagents are coated onto a substrate which permits quality to be maintained over a large number of redox cycles. The substrate may be insulating, semiconducting or conducting. Noble metals, such as gold, platinum or palladium may be dispersed by various methods, for example, ion exchange.

In one embodiment our agent takes the form of a reactive substrate for biological reductions. The agent may be coated onto a test tube or reaction vessel and equilibrated with hydrogen. The biological material is then introduced into the test tube and hetereogeneously reduced by the surface confined agent.

In another embodiment bipyridinium reagents, with or without dispersed noble metals, are coated onto electrodes. The electrodes may be conducting metals, such as gold, or graphite or any other conductor or semiconductor, such as silicon, indium phosphide and gallium arsenide. A voltage applied to the electrode or stimulation of photoelectric currents permit out agents to reduce large biological molecules.

Our agents are particularly helpful in the reduction of metal containing macromolecules, such as fericytochrome c, myoglobin and stellacyanin. Additionally our agents may be useful in enzymatic reactions, such as the reduction of $H^+$ with hydrogenase to produce $H_2$. The reductions are accomplished without the unacceptable by-products often associated with reducing agents and, in fact, our agents may be recycled for reuse.

In yet another embodiment our agents may be employed as electrodes for photogeneration of hydrogen from aqueous electrolytes. We have found that our bipyridinium reagents with dispersed noble metals can be bound to p-type silicon photocathodes in electrolytic cells and, by virtue of the viologen's very fast electron-accepting characteristics, the rate of reaction is substantially increased.

In operation our redox mediating agents are prepared from bipyridinium salts, such as those described in the above-referenced copending patent application, PCT Serial No. U.S.81/00949, and coated onto a substrate or electrode. Each monomer unit of the bipyridinium reagent has a $2+$ charge which is balanced in the presence of two halide counterions. The halide ions may be replaced by a $PtCl_6^{2-}$ complex ion, which is then reduced to yield embedded elemental $Pt(O)$ in highly dispersed form. Other noble metal complexs may be substituted for the platinum complex and the redox agents may be equilibrated with hydrogen. Appropriate enzymes, such as hydrogenase may be substituted for the noble metal catalyst.

Our invention will now be described in connection with various illustrations; however, it should be noted that various changes and modifications can be made by those skilled in the art without departing from the spirit and scope of our claims. For example, our fast electron-accepting reagent may take various forms. Various linking groups and binding groups may be added to a viologen center to produce a surface-confined, fast electron-accepting reagent. Additionally while most of our examples describe the use of ordinary test tubes functionalized on the inside surface with the redox mediating agent, the agents can also be anchored to higher surface area supports. Moreover, while our examples describe electrolytic cells, it should be obvious that our redox mediating agents can also find uses in fuel cells. Likewise, in many cases enzymatic catalysts can be substituted for our noble metal catalysts.

DESCRIPTION OF THE PREFERRED EMBODIMENTS

Figure 1:
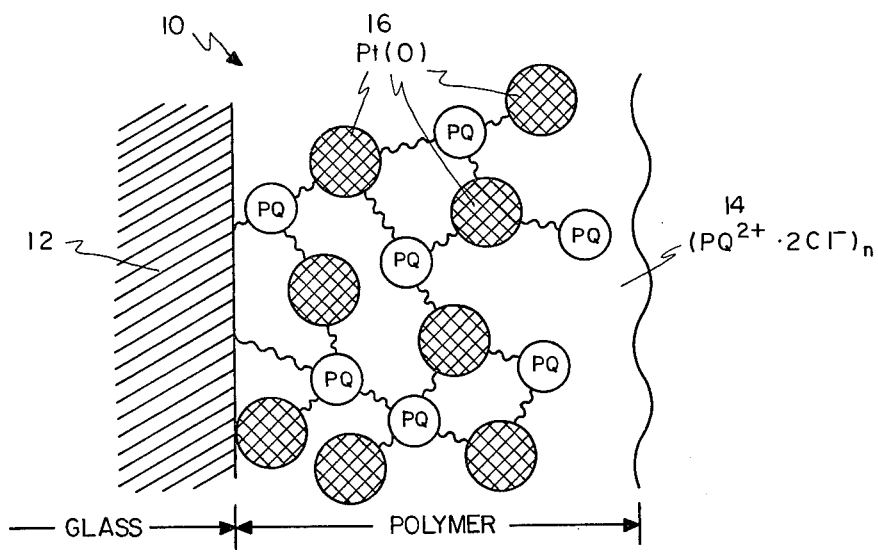
FIG. 1 is a schematic view of a redox mediating agent for biological reductions according to our invention.

The invention is best described with reference to the following non-limiting examples. The starting material for the experiments was the following bipyridinium salt:

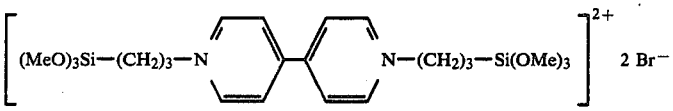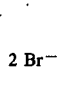

abbreviated as Reagent I in the following discussions. This reagent is also abbreviated as PQ (for paraquat, another name for 4,4'bipyridinium compounds). Reagent I is synthesized and characterized as follows: Dry 4,4'bipyridine (3.1 g, 0.02 mmol) (Aldrich) in dry $CH_3CN$ (200 ml) was added to 1-bromo-3-trimethoxysilylpropane, $\underline{II}$, (19.5 g, 0.08 mol) [prepared by reacting 4 equivalents of $HC(OMe)_3$ with 1-bromo-3-trichlorosilylpropane (Petrach Co.) then fractionally distilling $\underline{II}$ (b.p. 85° C./10 mm Hg)]. The mixture was refluxed for 24 hrs. cooled to 298 K and filtered to collect $\underline{I}$. The product $\underline{I}$ was then recrystallized twice from $CH_3CN/Et_2O$ and isolated as a solid pale yellow bromide salt, yield 95%.

EXAMPLE I

In this Example we report the synthesis of a redox mediating agent that allows the use of $H_2$ as a reductant for the one-electron reduction of horseheart ferricytochrome c (cyt $c_{(ox)}$), sperm whale myoglobin, and stellacyanin from the lacquer of Rhus vernicifera. Application of the principles illustrated by our catalyst in other systems is possible inasmuch as the reducing power of $H_2$ is sufficiently great that many biological systems are thermodynamically reducible with $H_2$. An advantage in using $H_2$ as a source of reducing power is that the oxidation product is $H^+$ which is acceptable since most biological systems are studied in buffered media. A heterogeneous agent is desirable to facilitate the separation of the catalyst from the product.

An agent for one-electron reductions using $H_2$ must include functionality that will allow equilibration of the substrate with the $H_2O/H_2$ couple without the undesirable result of hydrogenating the substrate. The aim is to have a catalyst that equilibrates $H_2$ in such a way that two $e^-$'s and $2H^+$'s are available from $H_2$, not two H atoms. A heterogeneous agent must also include the functionality that overcomes the usual kinetic and adsorption problems typically encountered in heterogenous electron exchange processes involving large biological molecules. Pyrex test tubes were filled with 10 M NaOH and allowed to stand for 5 min at 25° C., then rinsed liberally with distilled $H_2O$, and dried in an oven at 90° C.; 3 ml of $CH_3CN$ solution of ~3 mM $\underline{I}$ with trace $H_2O$ was introduced into the test tube, the test tube was corked, and allowed to react for ~3 days at 25° C.; the $CH_3CN$ solution of $\underline{I}$ was removed and the derivatized test tube was washed liberally with distilled $H_2O$ and heated in an oven at 80° C. for ~1 day to dry and further cross-link the polymer consisting of $PQ^{2+}$ centers derived from hydrolysis of the Si—OMe bonds in $\underline{I}$; the $(PQ^{2+}.2Br^-)_n$-bearing test tubes were then filled with an aqueous solution of ~3 mM $K_2PtCl_4$ to yield a $(PQ^{2+}.PtCl_4^{2-})$-bearing surface by ion exchange and the aqueous solution was removed and the test tube was again rinsed with distilled $H_2O$ (at this point the test tube generally had a distinct yellow coloration due to $PtCl_4^{2-}$ introduction); the test tube was then filled with distilled $H_2O$ and exposed to 1 atm $H_2$ that reduces $PtCl_4^{2-}$ to Pt(O) and the Pt(O) then equilibrated the $H_2O/H_2$ with the $PQ^{2+/+}$ redox centers to reduce the colorless $(PQ^{2+})_n$ to the intensely purple $(PQ\dot{+})_n$; and the synthesis of the functionalized test tube was completed by addition of 0.1 M HCl to oxidize $(PQ\dot{+})_n$ to $(PQ^{2+})_n$ with evolution of $H_2$ followed by liberal rinsing with distilled $H_2O$.

FIG. 1 shows schematically the form of our redox mediating agent 10 comprising an anchoring glass substrate 12, our bipyridinium reagent 14 and dispersed platinum 16.

Figure 2:
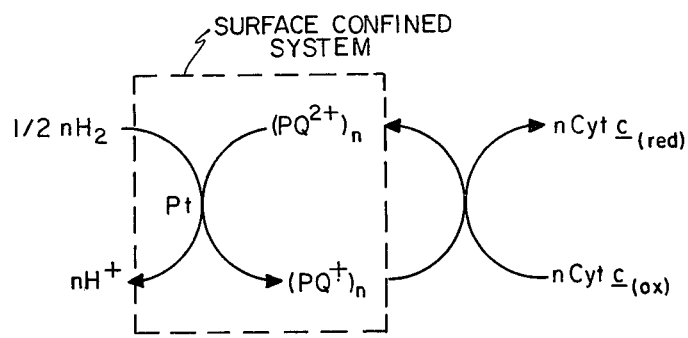
FIG. 2 is a diagram of a chemical reaction mediated by the agent of FIG. 1.

Using the glass/$[(PQ^{2+}.Pt(O).2Cl^-)_n]_{surf.}$ catalyst, $H_2$ effected the one-electron reduction of cyt $c_{(ox)}$ in a manner consistent with the intermediacy of $(PQ\dot{+})_n$. The reaction is shown schematically in FIG. 2. The reduction of cyt $c_{(ox)}$ was done at cyt $c_{(ox)}$ concentrations from ~5 μM to ~1 mM and we typically found that the $t_{\frac{1}{2}}$ from the formation of cyt $c_{(red)}$ was in the vicinity of 10 min with complete reaction (>95%) over in approximately 100 min at pH=7. During all stages of the reaction the functionalized test tube was purple in color, indicating that the equilibration of the polymer with $H_2$ was not the rate limiting step.

The glass/$[(PQ^{2+}.Pt(O).2Cl^-)_n]_{surf.}$ catalyst was also useful for the $H_2$ reduction of 50 $\mu$M sperm whale myoglobin and 0.12 mM stellacyanin under the conditions as for cyt $c_{(ox)}$. For $\sim$50 $\mu$M myoglobin the reduction appeared to occur as rapidly as for cyt $c_{(ox)}$ at $\sim$50 $\mu$M as evidenced by optical spectral changes.

EXAMPLE II

Figure 3:
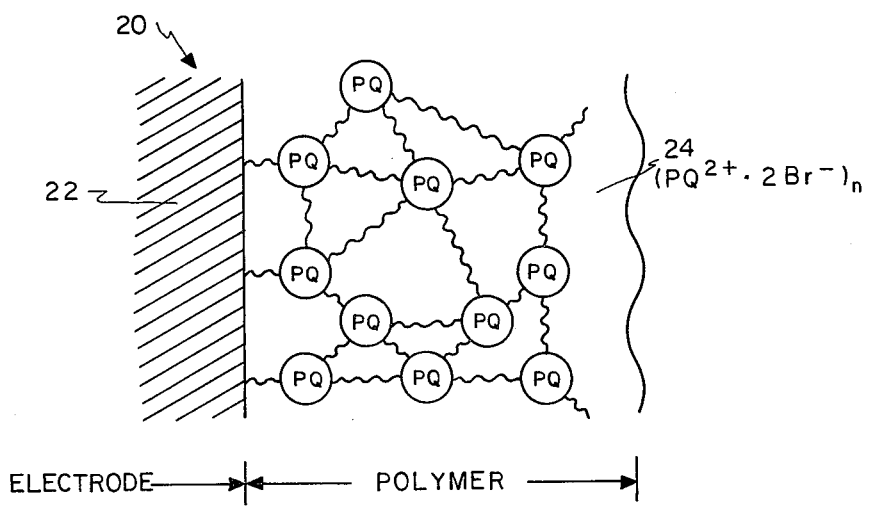
FIG. 3 is a schematic view of a redox mediating agent for electrochemical reductions according to our invention.
Figure 4:
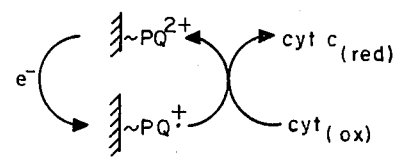
FIG. 4 is a diagram of a chemical reaction mediated by the agent of FIG. 3.

In this Example we report the use of electrodes derivatized with Reagent I to reduce ferriocytochrome c. We report significant enhancement of the rate of electrochemical reduction of horse heart ferricytochrome c [cyt $c_{(ox)}$] by surface derivatization of Au, Pt, or p-type Si electrodes with Reagent I. The cyt $c_{(ox)}$ gave a negligible response at the "naked" (nonderivatized) electrode in the same potential regime. FIG. 3 shows schematically the form of our electrochemical reducting agent 20 comprising electrode 22 and our bipyridinium reagent 24. In the approach we employed we exploited the fact that the reduced form of the redox reagent, reduces cyt $c_{(ox)}$ with a bimolecular rate constant of $>10^8$ $M^{-1}$ $sec^{-1}$. The reduction takes place at Au, Pt, and p-type Si electrodes according to the mechanism shown in FIG. 4.

Horse heart ferricytochrome c, of molecular weight 12,300 units was the highest purity material available (Sigma Chemical Co., type VI). As expected, cyt $c_{(ox)}$ was not reducible at naked Au or Pt electrodes even at potentials as much as 0.7 V more negative than the formal potential, $E^{\circ}$[cyt $c_{(ox)}$/cyt $c_{(red)}$]=0.02 V against a saturated calomel electrode (SCE). It was also not reducible at an illuminated, naked, p-type Si semiconductor photocathode, although it should be on thermodynamic grounds.

The redox mediating agents, shown in FIG. 3 were then tested. A platinum cathode coated with Reagent I yielded complete reaction of 2.2 mM cyt $c_{(ox)}$ in $H_2O$/1.0 M KBr at pH 7.0 (phosphate buffer). The Pt electrode bearing $2.7\times10^{-8}$ mole of the $(PQ^{2+/+}.)$ reagent was thus durable enough to carry out cyt $c_{(ox)}$ reduction on a synthetic scale. Similar behaviour was observed with pretreated Au electrodes derivatized with I.

Data was also obtained for cyt $c_{(ox)}$ reduction at an illuminated p-type Si/$(PQ^{2+/+}.)$ photocathode. Reduction did not take place at p-type semiconductors in the dark, but on illumination at an energy equal to or greater than the semiconductor band gap, reduction occurred at electrode potentials more positive than those at reversible electrodes such as Pt or Au. The reduction of $(PQ^{2+})$ on p-type Si occurred at a potential up to 550 mV more positive than on Pt or Au.

In summary, the mediated reduction of horse heart ferricytochrome c with electrodes modified with I showed that the mechanism for mediation involves reduction of the surface-confined reagent, which then interacts with ferricytochrome c. The observed rate of mediated reduction was mass transport-limited and a heterogeneous electron transfer rate constant $\geq$0.06 cm/sec was found. Electrodes were sufficiently durable to reduce ferricytochrome c in concentrations near its solubility limit without deterioration of their electrocatalytic activity.

EXAMPLE III

In this Example we report the use of electrodes derivatized with Reagent I and platinum to photoelectrochemically produce hydrogen from water. Experiments were performed in a single compartment Pyrex cell with a saturated chemical reference electrode (SCE), Pt counterelectrode and the appropriate working electrode. Photoelectrodes were illuminated using a beam expanded 632.8 nm He-Ne laser (Coherent Radiation) providing up to $\sim$50 mW/cm$^2$ over the entire electrode surface. A variety of working electrodes were tested. Single crystal B-doped p-type silicon wafers and P-doped n-type silicon wafers were obtained from Monsanto Co. Pt and Au electrodes were made from small sheets (4 mm$\times$8 mm) of the respective metals. W electrodes consisted of a length of W wire (0.030" diam) insulated with heat shrink tubing leaving a 1.4 cm length exposed as the working electrode surface. N-type $MoS_2$ was prepared by standard techniques. P-type Si was contacted by first evaporation of Al onto the Si pretreated by etching in concentrated HF for 60 seconds. The Al/Si was then annealed at 450° C. for 5 min under $N_2$. A copper wire lead was then attached with conducting Ag epoxy.

The W pretreatment consisted of immersing the wire in concentrated $HNO_3$ for $\sim$2 min followed by rinsing with distilled $H_2O$ and drying. N-type $MoS_2$ was functionalized after washing the concentrated HCl. After the appropriate pretreatment, derivatization with I was effected by immersing the electrode material in a $CH_3CN$ solution containing 1-3 mM I for 3-24 hrs., followed by rinsing with $CH_3CN$ and then acetone. For Pt, Au, W and n-Mos$_2$ derivatization with I was also effected by potentiostatting the pretreated electrode at $-0.7$ V vs. SCE in aqueous 0.2 M KCl and 0.1 M $K_2HPO_4$ (pH$-$8.9), solution of $\sim$3 mM I. The solution was not stirred and the derivatization was carried out under $N_2$ or Ar for 3 to 4 h. Coverage of the polymer, $(PQ^{2+})_n$, from I was determined by integration of cyclic voltametry waves for $(PQ^{2+})_n \rightleftharpoons (PQ^+)_n$.

In our experiments directly platinized working electrodes were compared with electrodes coated with Reagent I and dispersed platinium. Incorporation of the Pt(O) catalyst into the polymer of I was accomplished by dipping the electrode into an aqueous solution of 1 mM $PtCl_6^{2-}$ (dihydrogen or dipotassium salt) for $\sim$30 s at 298 K.[7] The electrode was then rinsed with distilled water. Reduction of Pt(IV)$\rightarrow$Pt(O) within the polymer was effected by immersing the potentiostatted electrode into the electrolyte solution at $-0.6$ V vs. SCE, and with $\sim$50 mW/cm$^2$ illumination at $-0.3$ V vs. SCE for the p-Si photocathodes. In direct platinization, the p-Si electrode was etched in concentrated HF for 30 s and characterized by its photocurrent voltage properties in a pH=7 phosphate buffer using 632.8 nm illumination at $\sim$50 mW/cm$^2$. After re-etching for 30 s in concentrated HF, the elecgrode was potentiostatted at $-0.3$ V vs. SCE (in some cases $-0.6$ V) in the platinizing solution and irradiated at 632.8 nm, 50 mW/cm$^2$. For W or n-type Si platinization is accomplished by potentiostatting at $-0.1$ Vs. SCE in the platinizing solution. The platinizing solution consisted of a 0.1 M NaClO$_4$, $\sim$1$\times$10$^{-3}$ M $K_2PtCl_6$ aqueous solution.

The quantity of Pt(O) deposited electrochemically was followed using a digital coulometer. Initial platinization of p-type Si typically involved passing $\sim$3$\times$10$^{-2}$ C/cm$^2$ of cathodic charge. The electron was then rinsed with distilled $H_2O$ and again checked for its photocurrent-voltage properties in pH$=$7 buffer.

Figure 5:
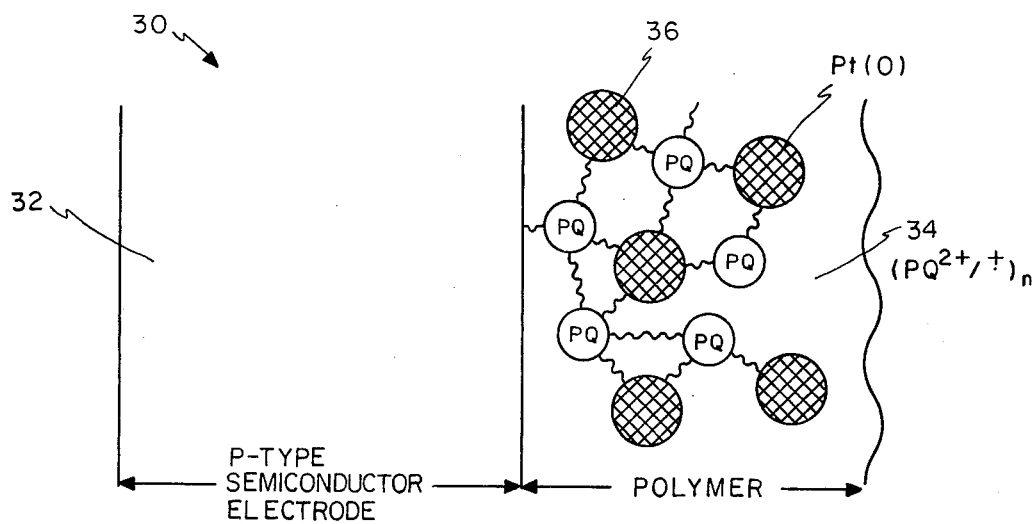
FIG. 5 is a schematic view of a redox mediating agent for hydrogen production according to our invention.
Figure 6:
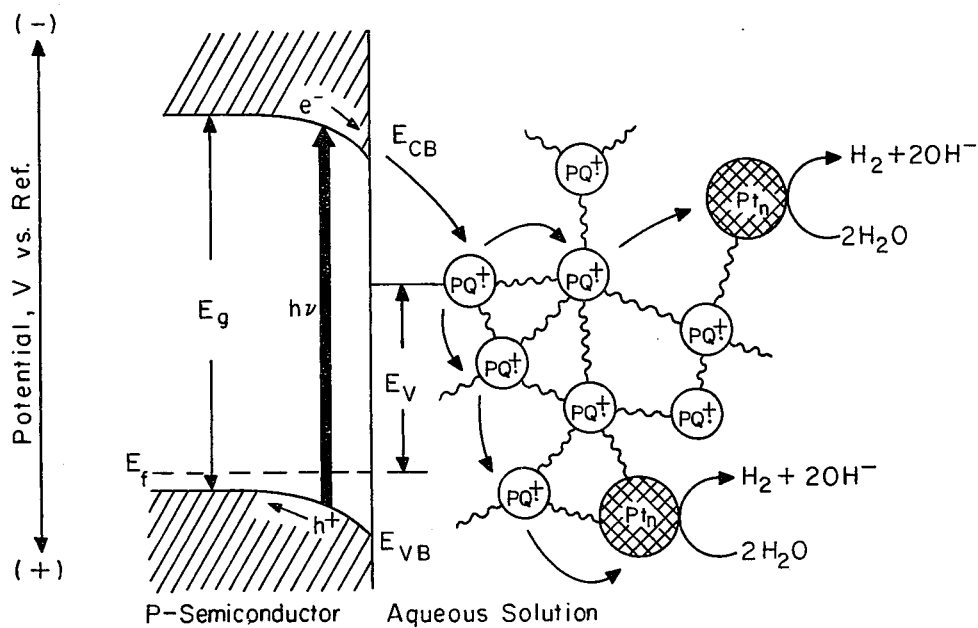
FIG. 6 is a diagram of an electrolytic reaction mediated by the agent of FIG. 5.

FIG. 5 shows schematically the structure of one of our coated electrodes 30 comprising a p-type semiconductor electrode 32, our bipyridinium reagent 34 and dispersed platinium 36. FIG. 6 is a representation of the mechanism of catalyzed $H_2$ evolution when the p-type electrode is illuminated and the redox agent is in contact with an aqueous electrolyte solution. In FIG. 6 the photovoltage, $E_v$, is the difference in $E_f$ and $E°(H_2O/H_2)$. The arrows show the flow of electrons indicating that the $Pt_n$ particles come into equilibrium with the reduced $PQ^{2+}$.

Figure 7:
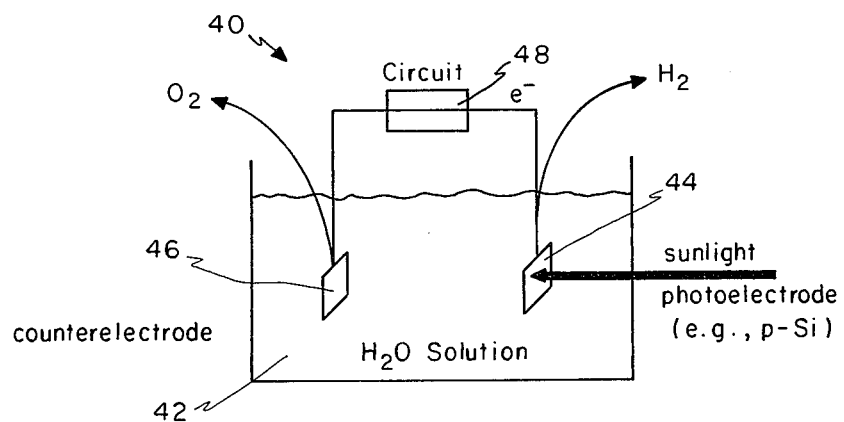
FIG. 7 is a schematic view of a photoelectrochemical cell employing our agents.

In FIG. 7 a photoelectrochemical cell 40 for splitting water is shown comprising a aqueous electrolyte 42, our coated electrode 44, a counter electrode 46 and appropriate analyzing circuitry 48.

The results of our experiments indicated that the photochemical production of hydrogen using an illuminated p-type semiconductor electrode coated with our redox agent was a substantial improvement over naked p-type silicon and was comparable with directly platinized p-type silicon. Experiments with n-type $MoS_2$, n-type Si, Pt, Au, and W cathodes functionalized with the $[(PQ^{2+/+})_n \cdot nPt(O)]_{surf.}$ system compared to the same surfaces directly platinized confirmed an important difference in the mechanism of $H_2$ evolution catalysis for the two surface catalyst systems. For the $[(PQ^{2+/+})_n \cdot nPt(O)]_{surf.}$ system there was an optimum pH for the catalysis, consistent with the pH independent formal potential of the $(PQ^{2+/+})_n$ system, $-0.50\pm V$ vs. SCE, relative to the formal potential of the $(H_2O/H_2)$ couple that moved 59 mV per pH unit. Qualitative experiments with insulating glass surfaces derivatized with $[PQ^{2+/+})_n \cdot Pt(O)]_{surf.}$ established directly that the Pt(O) was necessary, and sufficient, to equilibrate $(PQ^{2+/+})_n$ with $(H_2O/H_2)$.

We claim:

1. An apparatus for redox mediation comprising:
   (a) a substrate;
   (b) a substrate bound reagent comprising molecules having a redox-active bipyridinium center and binding groups which permit substrate-binding and cross-linking; and
   (c) at least one noble metal catalyst dispersed within the substrate-bound reagent.

2. The apparatus of claim 1 wherein the anchoring substrate comprises a glass reactor vessel.

3. The apparatus of claim 1 wherein the anchoring substrate comprises a high surface area support structure.

4. The apparatus of claim 1 wherein the noble metal comprises platinum.

5. The apparatus of claim 1 wherein the noble metal comprises gold.

6. The apparatus of claim 1 wherein the noble metal comprises paladium.

7. The apparatus of claim 2 wherein the substrate is an electrode.

8. The apparatus of claim 7 wherein the electrode comprises platinum.

9. The apparatus of claim 7 wherein the electrode comprises gold.

10. The apparatus of claim 7 wherein the electrode comprises a p-type semiconductor.

11. The apparatus of claim 10 wherein the semiconductor is silicon.

12. The apparatus of claim 10 wherein the semiconductor is indium phosphide.

13. The apparatus of claim 10 wherein the semiconductor is gallium arsenide.

14. The apparatus of claim 7 wherein the apparatus further comprises a noble metal catalyst dispersed within the bipyridinium reagent.

* * * * *